United States Patent [19]

Kanazaki et al.

[11] 4,140,371
[45] Feb. 20, 1979

[54] LIQUID CRYSTAL DISPLAY DEVICES

[75] Inventors: Mikio Kanazaki; Tadashi Ishibashi, both of Mobara, Japan

[73] Assignee: Hitachi, Ltd., Tokyo, Japan

[21] Appl. No.: 734,525

[22] Filed: Oct. 21, 1976

[30] Foreign Application Priority Data

Oct. 23, 1975 [JP] Japan .................. 50-127668

[51] Int. Cl.² .......................................... G02F 1/13
[52] U.S. Cl. ...................................... 350/336; 350/347
[58] Field of Search ............... 350/160 LC, 334, 336, 350/340, 347, 350

[56] References Cited
U.S. PATENT DOCUMENTS

| | | | |
|---|---|---|---|
| 3,877,015 | 4/1975 | Kanazaki | 350/160 LC |
| 4,035,060 | 7/1977 | Tsunoda | 350/160 LC |
| 4,036,550 | 7/1977 | Yih | 350/160 LC |

Primary Examiner—Samuel W. Engle
Assistant Examiner—Donald P. Walsh
Attorney, Agent, or Firm—Charles E. Pfund

[57] ABSTRACT

In a liquid crystal display device of the twisted nematic type comprising upper and lower substrates, upper and lower transparent electrodes formed on the inner surfaces of respective substrates, a liquid crystal interposed between the upper and lower electrodes with its molecules oriented in a twisted arrangement, each of the upper and lower electrodes is constituted by a plurality of electrode segments, and the upper electrode segments are displaced toward the lower edge of the display with respect to the corresponding lower electrode segments.

6 Claims, 12 Drawing Figures

LIQUID CRYSTAL DISPLAY DEVICES

BACKGROUND OF THE INVENTION

This invention relates to a liquid crystal display device, and more particularly to a liquid crystal display device free from the defects caused by an induced domain.

Field effect liquid crystal display device of the twisted-nematic type is generally accepted to be suitable for use as the display device of a handheld calculator, for example, because of its low power consumption. This type of the display device is constructed and operates as follows. Thus, a liquid crystal having a positive dielectric anistropy is interposed between upper and lower parallel substrates made of transparent glass, for example, with the molecules of the liquid crystal paralleled with the upper and lower substrates and twisted 90° therebetween. Such a display device is disposed between a pair of polarizers with polarizing axes intersecting with each other at right angles. With this construction, light impinging upon the device is polarized linearly by one of the polarizer. Then, its polarized plane is rotated 90° by the liquid crystal molecules in a twisted arrangement and finally the light transmits through the other polarizer. Where transparent electrodes formed with a pattern of a letter, digits or the like are applied to the inner sides of the upper and lower substrates and impressed with a voltage of from several to several ten volts, the liquid crystal molecules will be arranged in substantially the vertical direction or in the direction of the field. Under these conditions, the polarized plane of the incident light will not be rotated by the liquid crystal molecules, thus the incident light will be intercepted. Thus, the pattern can be displayed by switching the operation between transmission and interception of the light.

With the prior art liquid crystal display device having a construction just described, a display defect called an optical activity domain occurs under no voltage impressed. More particularly, where the directions of the micro-groups of the molecules are arranged at right angles on the inner sides of the upper and lower substrates, the molecules twist in the clockwise and counterclockwise directions. In other words clockwise optical activity domains and counterclockwise optical activity domains coexist in the same device.

As a result, at the interface between two types of domains, the orientation of the molecules becomes random, thus diffusing the light with the result that the quality of the display is greatly degraded. Further, a defect termed an induced domain occurs under impressed voltage. More particularly, when the liquid crystal is subjected to electric field, the major axes of the molecules tend to orient in the direction of the field, but slightly incline with respect thereto.

Such inclinations occur with righthand end of the molecule raised and lefthand end thereof raised, thus forming regions having different directions of orientation depending upon respective states of inclinations. Under these conditions the contrasts of the display are differrent in respective regions thus resulting in a spotting display. This phenomenon is called an induced domain.

The optical activity domain described above, however, can be eliminated by controlling the directions of the micro-groups between the upper and lower substrates such that the angle of twist of the liquid crystal molecules differs slightly from 90° or by incorporating into the liquid crystal such optical active substance as cholesteric. The induced domain is obviated by causing the liquid crystal molecules to orient slightly inclined, instead of parallel or horizontal, with respect to the upper and lower substrates under no voltage condition by providing orientation controlling structure formed, in general, by rubbing or obliquely vapor-depositing SiO substance. Such measure imparts polarities to the liquid crystal molecules so that the liquid crystal molecules orient in the same direction under electric field.

Where the direction of orientation is controlled in a manner described above, if the inclination of the molecules with respect to the upper and lower substrates is small, the induced domain still occurs especially at the edges of the transparent electrodes utilized in the display device. This tendency is enhanced when the display device is maintained at an elevated temperature.

SUMMARY OF THE INVENTION

Accordingly, it is an object of this invention to provide an improved liquid crystal display device capable of preventing the induced domain occurring at the edges of the electrode segments.

According to this invention there is provided a liquid crystal display device of the class including upper and lower substrates, transparent upper and lower electrodes respectively formed on the inner surfaces of the upper and lower substrates, a liquid crystal interposed between the upper and lower electrodes, the upper and lower substrates being constructed to cause the molecules of the liquid crystal to orient in a twisted arrangement, characterized in that each of the transparent upper and lower electrodes is constituted by a plurality of electrode-segments, and that the upper electrode segments are displaced toward a view point with respect to the corresponding lower electrode segments.

BRIEF DESCRIPTION OF THE DRAWINGS

In the accompanying drawings:

FIGS. 3A, 3B and 3C are enlarged sectional views taken along a line III—III in FIG. 2A in which FIG. 3A shows the direction of field created by a voltage impressed across the upper and lower electrodes; FIG. 3B shows a twisted arrangement of the liquid crystal molecules under no voltage condition; and FIG. 3C the orientation of the molecules under applied field;

FIGS. 5A and 5B are enlarged sectional views taken along a line V—V in FIG. 4 wherein FIG. 5A shows the direction of the field when voltage is impressed across the electrodes; and FIG. 5B shows the orientation of the liquid crystal molecules under electric field;

DESCRIPTION OF THE PREFERRED EMBODIMENTS

Figure 1:
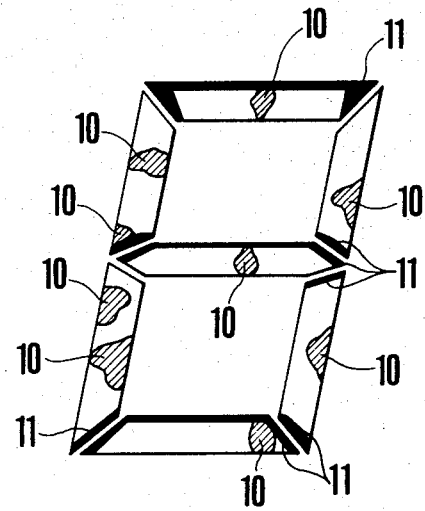
FIG. 1 is a diagrammatic representation of a liquid crystal display device showing the induced domain at the edges of the electrode-segments.
Figure 2A:
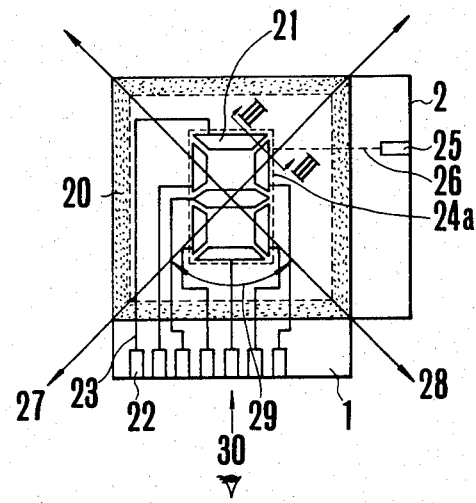
FIGS. 2A and 2B are plan views showing relative arrangements of the upper and lower transparent electrodes of the prior art liquid crystal display device.
Figure 2B:
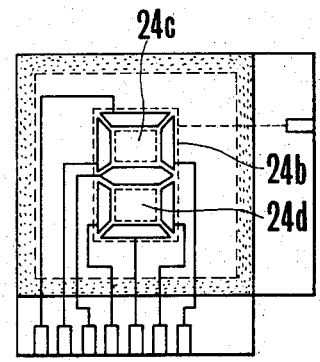
Figure 3A:
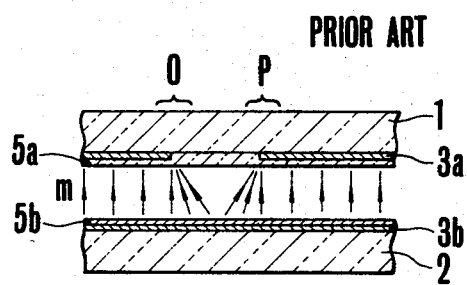
Figure 3B:
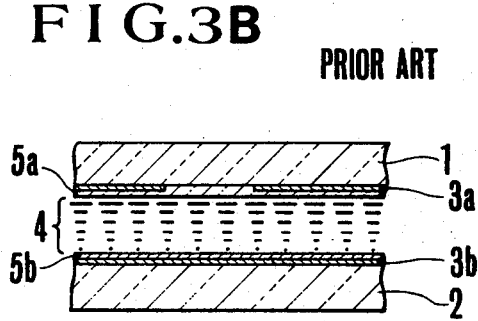
Figure 3C:
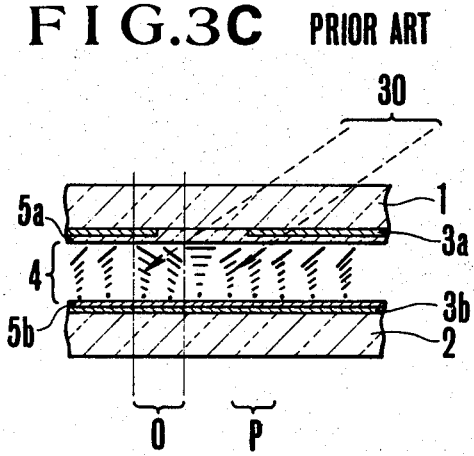

Before describing the invention, the defects of the prior art liquid crystal display device will be discussed briefly with reference to FIGS. 1, 2, 3A through 3C. Shaded areas 10 and black areas 11 shown in FIG. 1 represent a spotty display caused by the induced domain. However, the shaded areas 10 can be eliminated by controlling the orientation of the liquid crystal molecules by providing overlapped layers 5a and 5b of an electrode protective film and an orientation control structure as shown in FIGS. 3A to 3C. When the orientation is controlled in this manner and where the directions 27 and 28 of orientation of the upper and low substrates 1 and 2 and the direction 29 of twist are as shown in FIG. 2A, it is possible to make the contrast as viewed in the direction of arrow 30 much larger than that when the device is viewed in other directions. Because, among the liquid crystal molecules filled in the space defined by the upper and lower substrates 1 and 2 and a spacer 20 made of frit glass, the molecules at the intermediate portion of the gap between the upper and lower substrates are seen in the direction of their major axes. In the example shown in FIG. 2A, the upper transparent electrode 21 comprises a plurality of segments each connected to an external terminal 22 through a transparent lead 23. The lower transparent electrode 24a shown by dotted lines comprises a single electrode having an area covering the entire area of the upper electrodes 21 and connected to an external terminal 25 through a single lead 26. In the example shown in FIG. 2B, the lower transparent electrode 24b is formed by a single sheet, although stamped at two portions 24c and 24d, so that it is connected to the external terminal 35 through a single lead.

Even when the orientation is controlled in a manner described above, induced domains 11 occur at the edges of the electrode segments as shown in FIG. 1, especially at elevated temperatures. This is caused by the following reason. More particularly, as shown in FIG. 3A taken along line III—III in FIG. 2A, the direction of the electric field created between opposing transparent electrodes 3a and 3b extends in the direction shown by an arrow m which is substantially perpendicular to the electrodes 3a and 3b at the central portions thereof but inclines at the edges of the electrodes. The direction of inclination is different at regions O and P depending upon the relative position between electrodes 3a and 3b. Accordingly, the liquid crystal molecules 4 orienting in a definite direction under no field condition as shown in FIG. 3B will orient in the direction of inclined field at regions P and O when voltage is impressed. The direction of orientation of the liquid crystal molecules at region P is the same as that of the molecules at the central portion of the electrodes whereas at region O the direction of orientation is different from those at other regions as shown in FIG. 3C, thereby creating the induced domains at the edges of the electrode segments, which edges face the region O. That is to say, in the prior art liquid crystal element wherein the upper electrode is constituted by a plurality of electrode segments and the lower electrode by a single sheet (or vice versa), electric fields of different directions (regions O and P) are created at the electrode segment edges thus resulting in the difference between molecule orientations. For this reason, when viewed in the direction of arrows 30 shown in FIG. 3C, at the region P, the liquid crystal molecules are seen in the direction of their major axes so that the contrast is high, but at the region O, the molecules are seen in the direction of their minor axes so that the contrast is low. The view direction of arrow 30 corresponds to the direction of arrow 30 shown in FIG. 2A. In an ordinary liquid crystal display device the view point is located below the lower edge of the displayed pattern as viewed in FIG. 2A. Actually, viewing of a line display usually occurs with the text approximately horizontal and the viewer's eye positioned below the line of text such that it views the text at an angle other than normal to the plane of the display. Thus the view point 30 is generally within the sector 29 as viewed in FIG. 2A. In the following description, this view position is assumed.

When the liquid crystal molecules 4 are initially oriented to incline 20° to 30° with respect to the upper and lower substrates by using the special orientation control structure described above, the effect of the initial inclined orientation is larger than that of the inclined field so that no domain is created at the edges. However, colouring phenomena is remarkable and the falling response time is prolonged.

Figure 4:
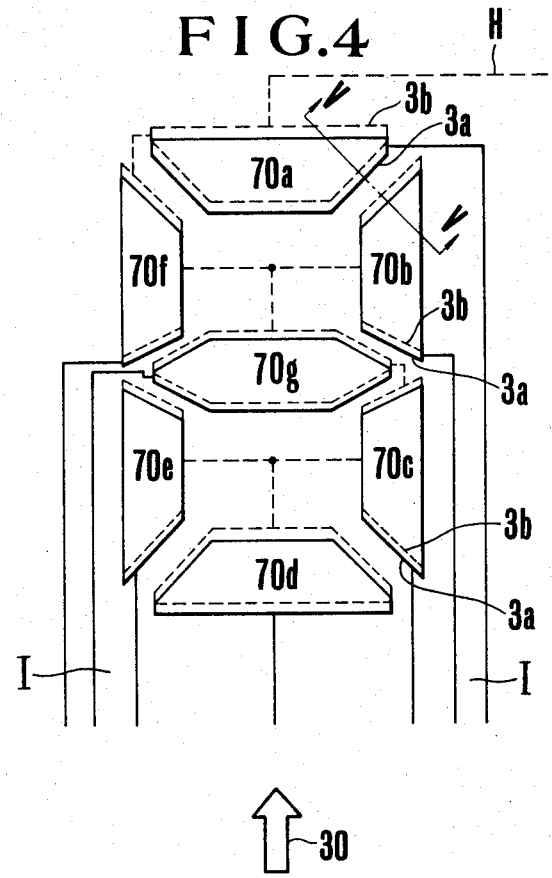
FIG. 4 is a plan view showing one example of the liquid crystal display device embodying the invention.
Figure 5A:
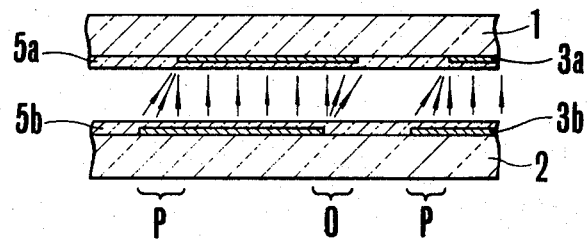
Figure 5B:
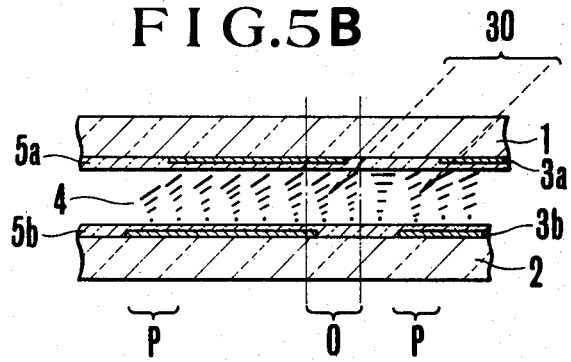

One embodiment of this invention will now be described with reference to FIG. 4. Transparent electrodes 3a and 3b having a pattern of a digit 8 are formed on the upper and lower substrates 1 and 2 by frustum shaped electrode segments 70a through 70g which are connected to leads H and I. In this manner, according to this invention both upper and lower electrodes are constituted by electrode segments for the purpose of eliminating the field as shown in FIG. 3A. With this segment construction, by constructing the corresponding upper and lower electrode segments, for example segments 70a, to have the same shape, undesirable disturbance of the field at the edges can be eliminated. However, in mass-production, it is difficult to form corresponding segments to have the same shape in a permissible margin. For this reason, according to this invention, as shown in FIG. 4, the upper electrode segments 3a are diplaced with respect to the lower electrode segments 3b shown by dotted lines toward the view position (that is in the direction opposite to arrow 30) for the purpose of eliminating the undesirable disturbance of the field. Referring now to FIGS. 5A and 5B showing the cross-section taken along line V—V in FIG. 4, the direction of the field at region O is the same as that of the field at region P as shown in FIG. 5A, so that the direction of orientation of the molecules at region O is the same as that in other regions as shown in FIG. 5B thereby eliminating the induced domain at the edges. More particularly, liquid crystal molecules at regions O and P are viewed in the direction of their major axes along view 30 so that there is no difference between contrasts.

As the result of experiment, it was found that the displacement in the direction of view of the upper segments with respect to the lower segments may be substantially the same as the gap (5 to 50 microns) between the upper and lower substrates 1 and 2. Such displacement is feasible with conventional manufacturing technique.

While in the foregoing description, all upper electrode segments were displaced with respect to the corresponding lower electrode segments, only transverse segments 70a, 70g and 70d, that is segments in which the induced domain at their edges are remarkable may be displaced.

Figure 8:
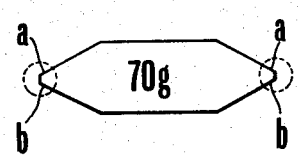
FIG. 8 show diagrams useful to explain disturbance of field at the corners of electrode segment.
Figure 8:
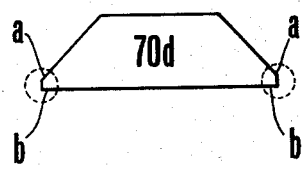
Figure 6:
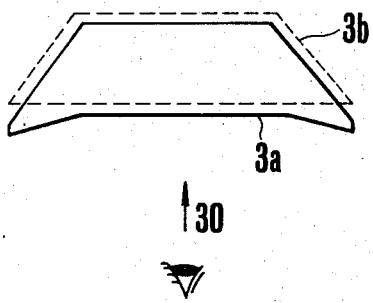
FIGS. 6 and 7 show plan views of modified electrode segments utilized in this invention.
Figure 7:
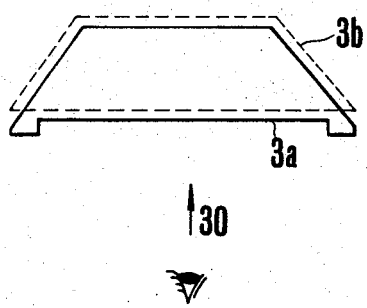

In the modified embodiments shown in FIGS. 6 and 7, in addition to the displacement between corresponding upper and lower electrode segments, both corners of the lower side of the frustum-shaped upper electrode segment may be projected beyond the lower edge of the lower electrode segment. In the modification shown in FIG. 6 the corners are gradually protruded. In the modification shown in FIG. 7, rectangular projections are formed at the corners of the lower side. Such projections have the effect of increasing the displacement thus eliminating otherwise occuring induced domains due to more complicated disturbance of the field than both lateral sides of the frustum. More particularly, adverse electric fields occurring at sides a and b at the corners of the electrode segment within a dotted line circle, as shown in FIG. 8, are added to enhance the generation of the induced domains. To suppress the induced domains at the corner, it is important to eliminate the adverse electric field occurring at least either side a or b when taking into consideration possible deformations and unwanted displacements of the upper and lower electrodes in the course of massproduction. The provision of the projections as shown in FIGS. 6 and 7, therefore, contributes to suppress a great induced domain which would otherwise occur. For this reason, these modifications are suitable for the lowest segment 70d of the digit 8 pattern (FIG. 4) at which the defect of the induced domain will be observed to a great extent.

Although in the foregoing embodiments the invention was applied to a static driven type display device, it should be understood that the invention is also applicable to the multi-digit type display device and the matrix type display device operated by dynamic drive.

What is claimed is:

1. In a twisted nematic type liquid crystal display device of the class including upper and lower spaced substrates, transparent upper and lower electrodes respectively formed on the inner surfaces of said upper and lower substrates, a liquid crystal, interposed between said upper and lower electrodes, means to cause the molecules of said liquid crystal to orient in a twisted arrangement, the improvement to prevent edge domain formation wherein each of said transparent upper and lower electrodes is constituted by a plurality of pairs of substantially overlayed upper and lower electrode segments, said means for orienting said molecules comprises means for selectively applying an electric field between pairs of upper and lower electrode segments, and at least some of the upper electrode segments are displaced toward the lower edge of a pattern to be displayed with respect to the corresponding lower electrode segments to cause the lower edge of said some upper electrode segments of a pair to not overlay the lower electrode of its pair by an amount sufficient to prevent edge domain formation in the liquid crystal when an electric field is applied between said some upper electrode segments and the corresponding lower electrode of the pairs.

2. The liquid crystal display device according to claim 1 wherein only the upper electrode segments extending in the direction perpendicular to the direction from which the display is viewed are displaced toward said lower edge with respect to the corresponding lower electrode segments by an amount which substantially aligns the molecules between the corresponding edges of said upper and lower segments of a pair with the molecules in the central portion of said segments when said pair has an electric field provided by said field applying means.

3. The liquid crystal display device according to claim 1 wherein said plurality of electrode segments are arranged in a display pattern of a digit 8, said view position is located below the vertical axis of the display pattern and the upper electrode segments are displaced toward said lower edge with respect to the corresponding lower electrode segments by an amount substantially the same as the space between said upper and lower electrodes, each pair of said segments being of substantially the same size and shape.

4. The liquid crystal display device according to claim 3 wherein the segments positioned at the lower side of a digit 8 shaped display pattern have a substantially frustum shape, and projections are formed on the opposite corners of the lower side of the frustum.

5. The liquid crystal display device according to claim 4 wherein the width of said projections increases gradually toward said lower edge.

6. The liquid crystal display device according to claim 4 wherein said projections include a rectangular position.

* * * * *